United States Patent
Montag

[11] Patent Number: 6,142,714
[45] Date of Patent: Nov. 7, 2000

[54] PARTICULATE MATERIAL ACCELERATOR CONVEYOR

[76] Inventor: Roger A. Montag, 7500 Stiles Rd., Howardstown, Ky. 40051

[21] Appl. No.: 09/097,346

[22] Filed: Jun. 15, 1998

[51] Int. Cl.[7] .......................... B65G 53/08; B65G 53/48
[52] U.S. Cl. .............................. 406/58; 406/38; 406/96; 406/97; 406/109; 406/151; 406/197
[58] Field of Search .................... 406/38, 46, 58, 406/63, 93, 96, 97, 100, 101, 102, 108, 109, 122, 151, 197

[56] References Cited

U.S. PATENT DOCUMENTS

| | | |
|---|---|---|
| 1,423,221 | 7/1922 | Jeffers . |
| 1,544,407 | 6/1925 | Jeffers . |
| 2,225,397 | 12/1940 | Franks . |
| 2,393,412 | 1/1946 | Riddell . |
| 2,488,626 | 11/1949 | Hansen ................................ 406/109 |
| 2,542,476 | 2/1951 | Carlson . |
| 2,544,813 | 3/1951 | Wall ..................................... 406/100 |
| 2,712,412 | 7/1955 | West . |
| 3,399,771 | 9/1968 | Hryniowski . |
| 3,658,211 | 4/1972 | Kitchens . |
| 3,724,908 | 4/1973 | Burrough et al. ................... 406/102 |
| 3,995,668 | 12/1976 | Goodman . |
| 4,024,985 | 5/1977 | Iinoya et al. . |
| 4,128,191 | 12/1978 | Frase et al. . |
| 4,767,322 | 8/1988 | Beckenbach et al. . |
| 4,793,744 | 12/1988 | Montag . |
| 4,913,597 | 4/1990 | Christianson et al. .............. 406/109 |
| 4,970,830 | 11/1990 | Schlick . |
| 5,356,280 | 10/1994 | Ponzielli . |

OTHER PUBLICATIONS

"Kongskilde" advertisement published at least befor Apr. 7, 1998, 1 Page.

Crary "Hi–Pressure Fans" advertisement published before Jun. 15, 1998, 1 Page.

*Primary Examiner*—Christopher P. Ellis
*Assistant Examiner*—Joe Dillon, Jr.
*Attorney, Agent, or Firm*—Zarley, McKee, Thomte, Voorhees & Sease

[57] ABSTRACT

A particulate material accelerator conveyor includes a housing having a wall with openings therein for an air inlet, a particular material inlet, and a mixture outlet; a feed auger rotatably mounted in the housing and in fluid communication with the particulate material inlet so as to convey particulate material from the inlet into an acceleration chamber within the housing; and a fan rotatably mounted in the housing in fluid communication with the air inlet and the acceleration chamber. The fan includes a plurality of fan blades for accelerating air from the air inlet toward the housing wall and thereby providing a flow of accelerated air along the inside of the wall and toward the particulate material and move therewith toward the mixture outlet. The positioning of the fan in the housing and the resulting air flow therefrom prevents particulate material from contacting the fan blades and thereby damaging the particulate material. An impeller can be rotatably mounted in the housing between the auger and the fan so as to mechanically accelerate the particulate material before the air flow further accelerates it. The impeller can also help isolate the particulate material from the fan blades.

30 Claims, 5 Drawing Sheets

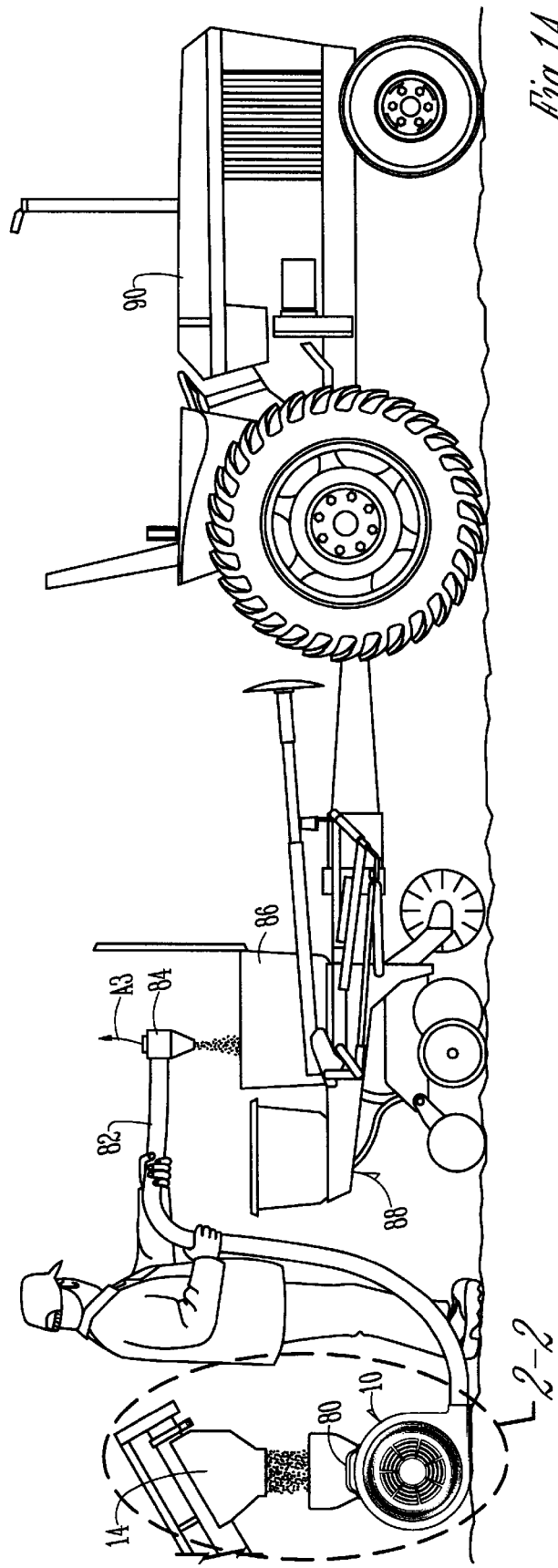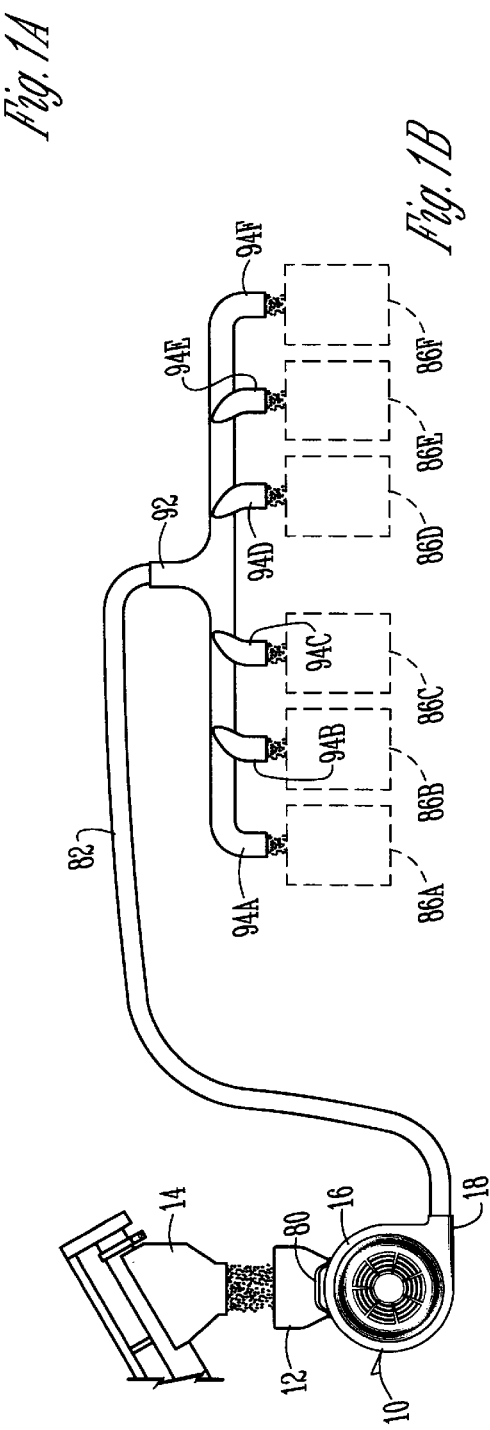

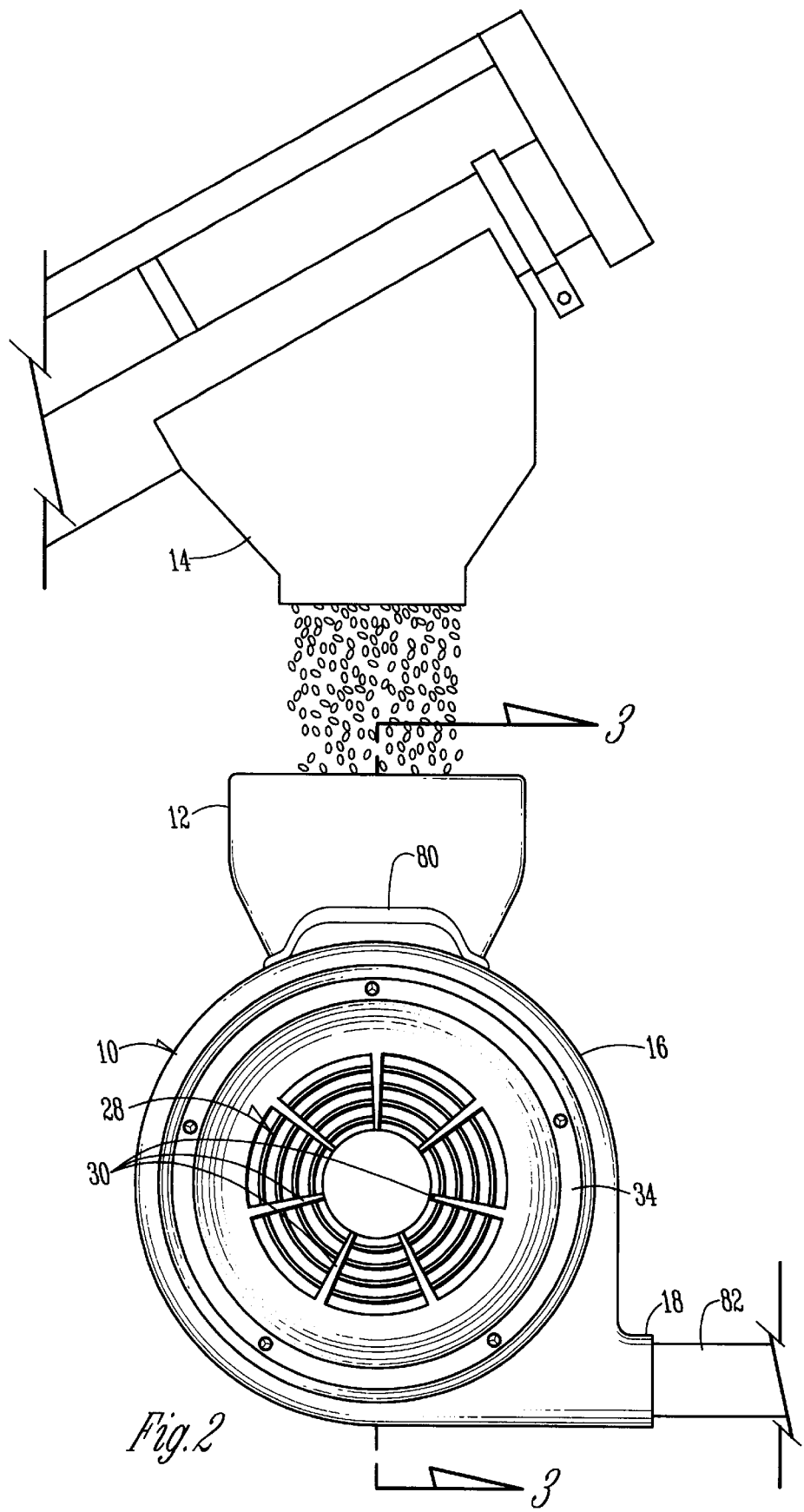

PARTICULATE MATERIAL ACCELERATOR CONVEYOR

BACKGROUND OF THE INVENTION

The present invention relates to the field of conveying particulate material. More particularly, this invention relates to a means and method for accelerating and delivering particulate material, such as grains, seeds, fertilizers, pesticides, pelletized plastic and any other material capable of being transferred pneumatically, without damaging the material.

Various conveying devices and methods for particulate material are known. One such device is disclosed in my U.S. Pat. No. 4,793,744 which is incorporated herein by reference. However, conventional devices often damage the particulate material being conveyed. The particulate material is allowed or encouraged to come into contact with the blades of the fan or other means which is used to accelerate the particulate material.

Therefore, a primary objective of the present invention is the provision of an improved particulate material conveyor.

Another objective of this invention is the provision of a method for accelerating and delivering particulate material with minimal damage to the material.

Another objective of this invention is the provision of a portable apparatus for accelerating particulate material.

Another objective of this invention is the provision of an apparatus for accelerating particulate material wherein the fan blades are remote from the mixture acceleration chamber.

Another objective of this invention is the provision of a particulate material accelerator conveyor that is inexpensive to manufacture, durable in use, and reliable.

These and other objectives will become apparent from the drawings, as well as from the description and claims which follow.

SUMMARY OF THE INVENTION

The present invention relates to an apparatus for accelerating and conveying particulate material. The particulate material accelerator conveyor includes a housing having a wall with openings therein for an air inlet, a particulate material inlet, and a mixture outlet; a feed auger rotatably mounted in the housing and in fluid communication with the particulate material inlet so as to convey particulate material from the inlet into an acceleration chamber within the housing; and a fan rotatably mounted in the housing in fluid communication with the air inlet and the acceleration chamber.

The fan includes a plurality of fan blades for accelerating air from the air inlet toward the housing wall and thereby providing a flow of accelerated air along the inside of the wall and toward the particulate material which then moves therewith toward the mixture outlet. The location of the fan and the air displaced therefrom prevents particulate material from contacting the fan blades and thereby damaging the particulate material.

An impeller can be rotatably mounted in the housing between the auger and the fan so as to mechanically accelerate the particulate material before the air flow from the fan further accelerates it. When an impeller is utilized, it is interposed between the feed auger and the fan so as to act as a partition or barrier to help isolate the particulate material from the fan blades.

For greater efficiency, air can be recirculated into the fan and reaccelerated. A plurality of small holes or a deflector fan can be utilized to keep particulate material from being recirculated along with the air into the fan blades.

Various accessories can be utilized to convey, deliver, and separate the air and particulate material mixture. A conduit or hose has one end connected to the discharge opening of the accelerator conveyor and another end attached to a separating and discharging device. This allows the user to accelerate, convey, and discharge the particulate material into a bin and discharge the air elsewhere. A manifold can be used to discharge the particulate material in a plurality of bins at the same time. Multiple augers can be used so that the accelerator conveyor can mix a plurality of particulate materials together for acceleration and delivery. The accelerator conveyor can also be provided with a handle so as to be portable and carried by hand.

BRIEF DESCRIPTION OF THE DRAWINGS

FIG. 1A is a perspective view of the particulate material accelerator conveyor of this invention being used for conveying grain, seed, or other particulate material.

FIG. 1B is a perspective view of another embodiment of this invention wherein a manifold is used to deposit the conveyed material into a plurality of separate bins.

FIG. 2 is an enlarged perspective view of the area designated 2—2 in FIG. 1A.

DETAILED DESCRIPTION OF THE PREFERRED EMBODIMENTS

Figure 3:
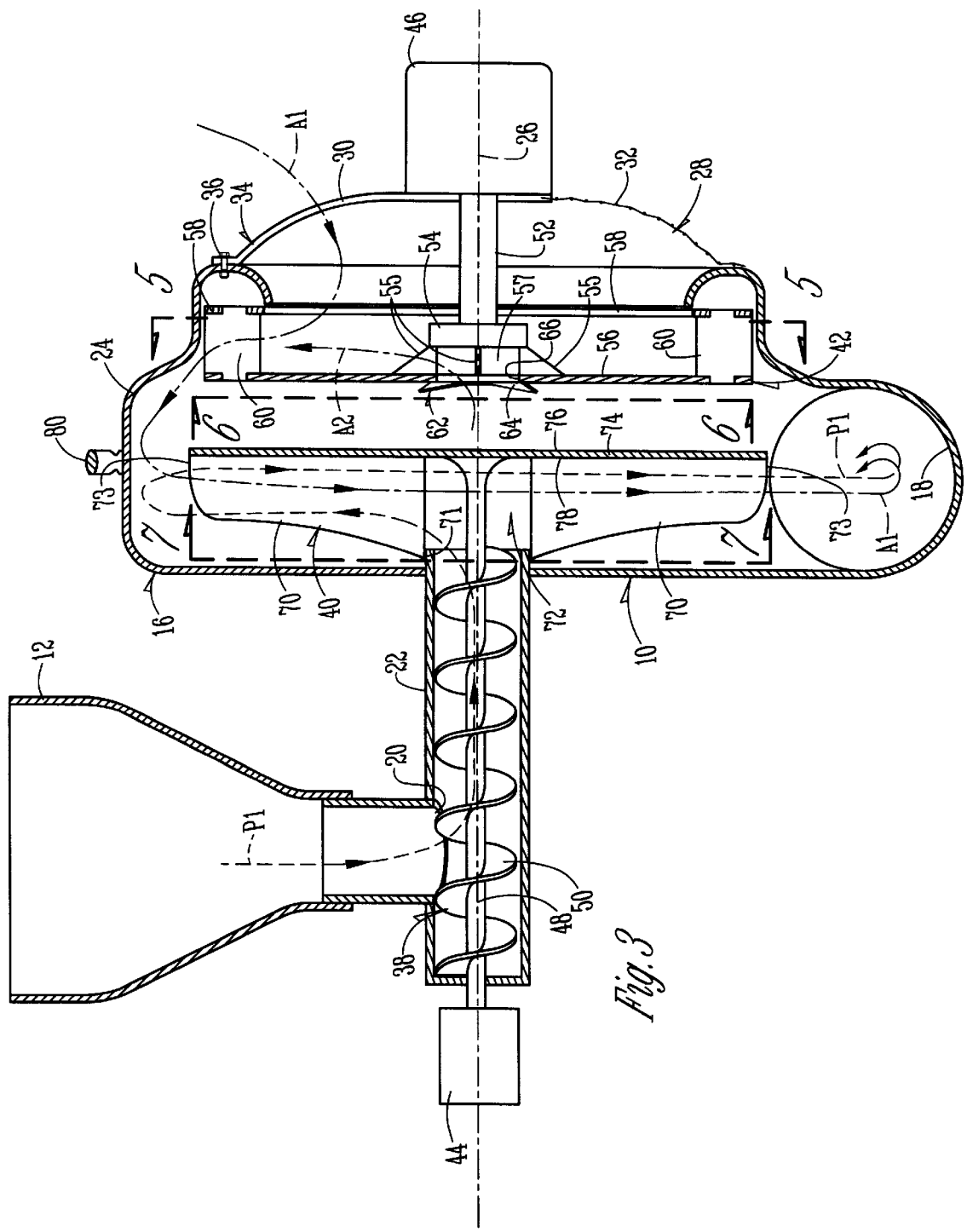
FIG. 3 is a cross-sectional view taken along line 3—3 in FIG. 2 and shows the path of the air and particulate material in the invention.

In the figures, the accelerator conveyor of this invention is designated by the reference numeral 10. FIG. 2 shows that the accelerator conveyor 10 has a hopper 12 for receiving particulate material, such as grain, seed, fertilizer, pesticides and the like, from a conventional chute means 14. The accelerator conveyor 10 includes a housing assembly 16, which has a discharge or outlet opening 18 and is in fluid communication with the hopper 12 at a particulate material inlet 20.

Referring to FIG. 3, the housing assembly 16 includes an auger tube 22 attached to a radially enlarged mixing and accelerating section 24 along a central axis 26. The side of the housing assembly 16 opposite the auger tube 22 has an air inlet opening 28 therein. The air inlet 28 is covered in an air permeable manner by rigid ribs 30 and screen members 32 extending between the ribs 30. The ribs 30 extend from a convex cover 34 which is attached to the mixing section 24 by a plurality of conventional fasteners 36.

Mounted in the housing assembly 16, preferably along the central axis 26, are an auger 38, an impeller 40, and a fan 42.

However, the auger 38, impeller 40 and fan 42 can be mounted on separate, noncoincidental axes. In the preferred in embodiment, the auger 38 is drivingly attached to the impeller 40, and both are rotatably driven by a motor 44. On the other side of the housing assembly 16, the fan 42 is rotatably driven by a motor 46 mounted on the cover 34. Preferably the motors 44, 46 are of the hydraulic type and can be powered by the auxiliary hydraulics of a tractor or the like. However, other types of motors, including but not limited to electric motors, can be utilized. It is also contemplated that a single motor could power both the fan and auger/impeller with appropriate clutches and drive reductions. However, separate drive motors are preferred because this gives greater control of tip speeds and greater flexibility. The auger 38 has a shaft 48 and a continuous helical flighting 50 for conveying particulate material in the direction shown by the arrow P1 and its extension.

Figure 5:
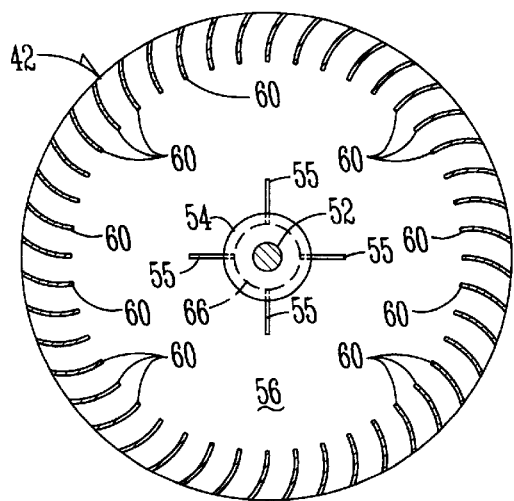
FIG. 5 is a cross-sectional view of the fan of this invention taken along line 5—5 in FIG. 3.
Figure 6A:
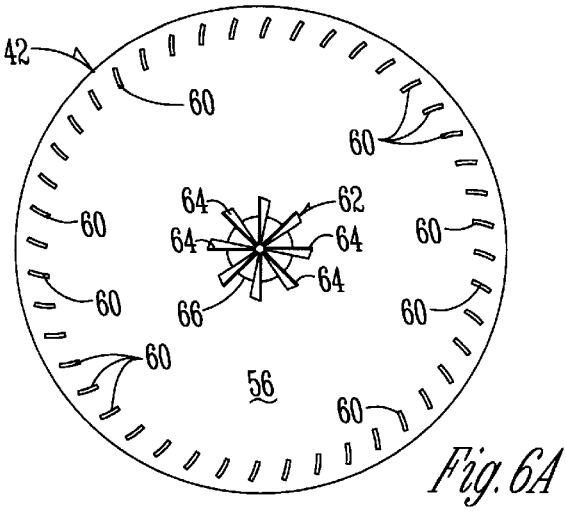
FIG. 6A is a rear elevation view of the fan of this invention taken along line 6—6 in FIG. 3.

The fan motor 46 is drivingly connected to the fan 42 by a shaft 52 and a hub 54. The hub 54 can be offset from the rear plate 56 and attached thereto by a plurality of angularly spaced radially extending fins 55 so as to provide a gap 57 an opening 66 for recirculating the air. The fan 42 is of the cage or fan wheel type and has a circular rear plate or disc 56 and a front circular ring 58 which are interconnected by a plurality of fan blades 60. The blades 60 are generally directed radially so that air drawn through the air inlet 28 is displaced by the rotation of the fan, as shown by the arrow Al. The blades 60 are secured between the disc 56 and the ring 58 as shown in FIGS. 3, 5, and 6A. As best seen in FIG. 5, the blades 60 of the fan 42 are preferably forwardly inclined from inner tip to outer tip and are curved so that they are slightly concave with respect to the direction of rotation. However, other curvatures and inclines can be utilized, depending on the particular air flow results desired.

FIG. 6A shows another aspect of the preferred embodiment wherein the fan 42 includes a deflector fan 62 protruding from the side of the disc 56 opposite the air inlet 28 (toward the impeller 40 in FIG. 3). The deflector fan 62 has a plurality of angularly spaced generally triangular deflector blades 64 attached to the rear plate 56 for rotation therewith. An air recirculation opening 66 extends into the inner periphery of the fan 42. The deflector fan 62 effectively blocks the opening 66 so that air is drawn into the opening 66, yet stray particulate material is gently deflected away so it cannot reach the fan blades 60. Air can recirculate through the opening 66 as shown by the arrow A2 in FIG. 3.

Figure 6B:
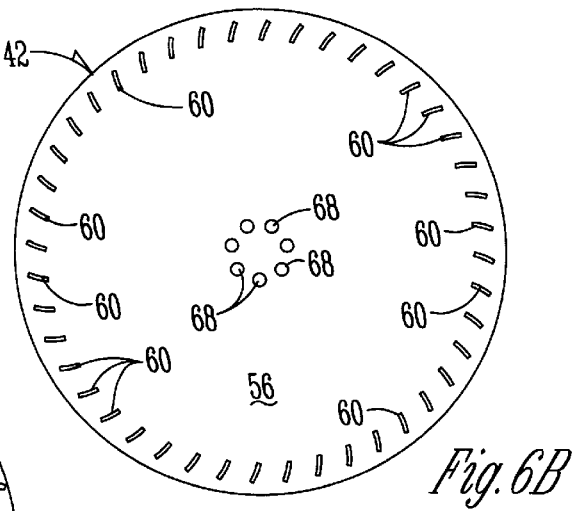
FIG. 6B is an elevation view of the fan similar to FIG. 6A, but shows an alternative embodiment of the venting and deflecting means.

An alternative embodiment of the fan is shown in FIG. 6B. A plurality of holes 68 are provided at the center of the rear plate 56 so as to allow air to flow therethrough, but prevent the passage of particulate material due to the size of the holes 68 relative to the size of the particulate material and/or the speed of the fan wheel 42.

It has also been found that the relative areas of the holes 68 or opening 66, opening 28, and the gap between the fan 42 and the housing 16 can be varied to affect the vacuum pressure near the center of the impeller 40.

Figure 7:
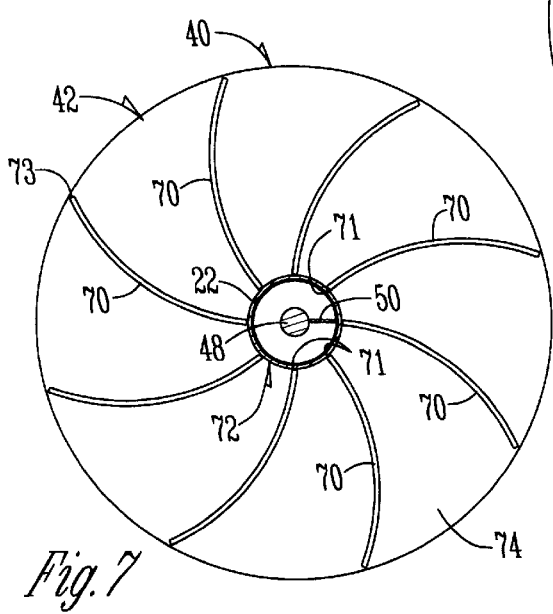
FIG. 7 is a front elevation view of the impeller.

Referring to FIG. 7, the impeller 40 has a plurality of angularly spaced blades 70 raised above a disc or plate 74 having opposite sides 76, 78. The impeller blades 70 extend outward radially toward the periphery of the impeller 40 and upwardly from side 78 in the direction of the auger 38 (FIG. 3). The blades 70 curve rearwardly and are inclined forwardly with respect to the direction in which the impeller 40 rotates.

The blades 70 extend inwardly from the outer periphery of the impeller 40 to define a central cylindrical space 72 which closely receives the auger tube 22 and shaft 48. The inner periphery or tip 71 of the blades 70 extends very close to the auger tube 22 so as to prevent particulate material from becoming jammed therebetween and/or escaping operative contact with the impeller 40. The outer periphery or tip 73 of the impeller 40 extends almost tangential to the discharge outlet 18. Thus, the impeller 40 acts as a partition or barrier to help isolate the particulate material from the fan 42. A small annular space is provided between the housing assembly 16 and the impeller 40 so that the air from the fan 42 can flow through to further accelerate the particulate material thrown outwardly by the impeller 40.

Figure 4A:
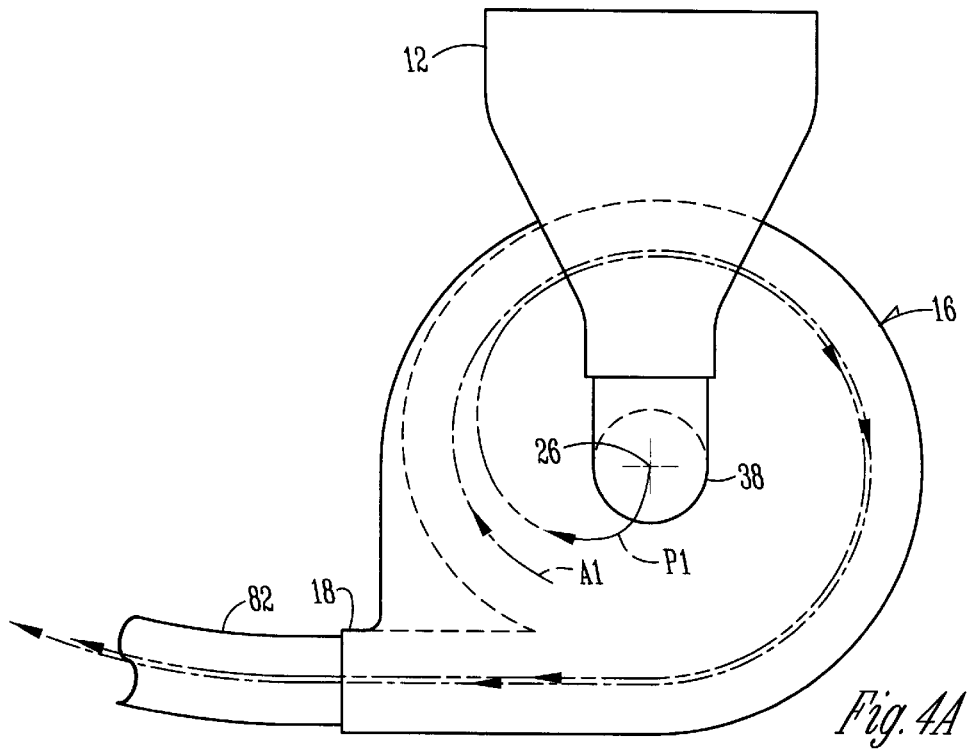
FIG. 4A is a simplified flow diagram of the movement of materials within the conveyor when a single auger is utilized.

FIG. 4A shows the general flow of particulate material and air in the preferred embodiment. In this embodiment, only one auger and one corresponding hopper 12 are provided. The particulate material, auger 38, and air from the fan 42 move in a clockwise direction as shown and then are discharged through the discharge opening 18.

Figure 4B:
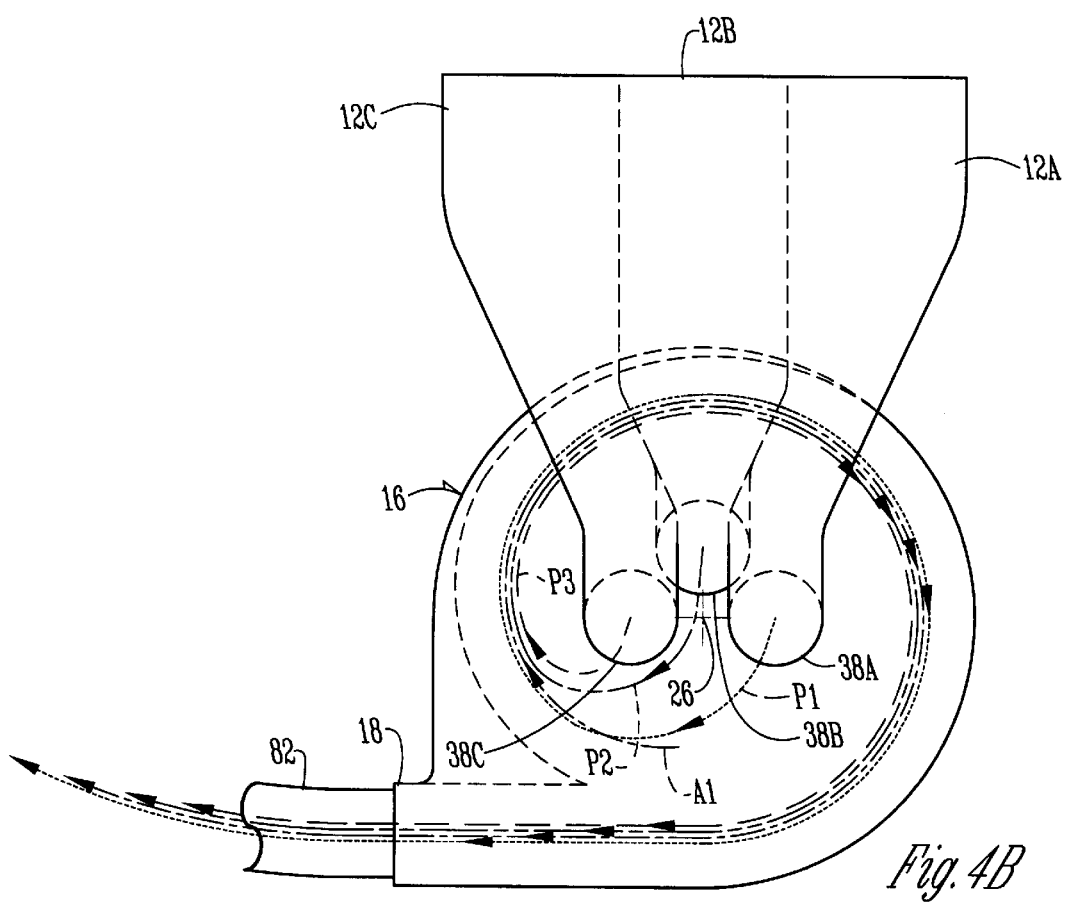
FIG. 4B is a simplified flow diagram similar to FIG. 4A, but shows an alternative embodiment wherein a plurality of augers are utilized.

In an alternate embodiment shown in FIG. 4B, three augers 38A, 38B, 38C are utilized to convey materials from three separate hoppers 12A, 12B, and 12C. Again the direction of flow of the materials is in a generally clockwise direction. The augers 38A, 38B, and 38C are arranged approximately equidistant from the central axis 26, about which the impeller 40 and the fan 42 rotate. For example, this embodiment allows granules of fertilizer or pest control materials to be mixed with seeds for use with a planter.

FIGS. 1A and 1B disclose some accessories which can be associated with the accelerator conveyor 10 of this invention. In FIG. 1A, a handle 80 is attached to the accelerator conveyor 10 so that the device is portable and can be carried by hand. A conduit 82, preferably a flexible hose, has one end connected to the discharge opening 18 and another end connected to a separating and discharging device 84. The device 84 separates the air from the particulate material, exhausting the air to the atmosphere and discharging the particulate material into a bin 86 waiting below. The bin 86 can be carried on a conventional planter 88 pulled by a conventional tractor 90. Preferably the separating and discharging device 84 is of the type manufactured by Kongskilde under the designation OK Series. The Kongskilde separating device utilizes a cyclone discharge means to separate the particulate material (grain) from the air. The Kongskilde device discharges the air out the top and the particulate material out the bottom.

In FIG. 1B, the conduit 82 extends from the discharge outlet 18 to a manifold 92 having a plurality of discharge outlets 94A, 94B, 94C, 94D, 94E, and 94F for discharging particulate material into separate corresponding bins 86A, 86B, 86C, 86D, 86E, and 86F, respectively.

Referring to FIGS. 1A and 3, the accelerator conveyor 10 operates as follows. The particulate material to be accelerated and conveyed is placed in the hopper 12, perhaps by a chute means 14. The auger motor 44 and the fan motor 46 are activated so as to turn the fan 42, auger 38 and impeller 40 in the same direction (here clockwise when viewed from the air inlet 28). The particulate material flows along the path P1 through the auger 38 and is conveyed into the path of the impeller blades 70 at their inner periphery or tip 71. The turning impeller 70 creates negative air pressure (vacuum) near tips 71 and positive pressure near tips 73. The particulate material is mechanically accelerated in a radial direction by the impeller blades 70. When the particulate material reaches the outer periphery or tip 73 of the impeller blades, the flow of air, shown by the arrow A1, engages the particulate material accelerated by the impeller 40 and further accelerates it in a circular motion around the impeller 40, as indicated by the arrows. Some of the kinetic energy of the air flow is imparted on the particulate material. Of course, this slows the air flow somewhat. The accelerated particulate material and air mixture is then discharged through the mixture outlet or discharge opening 18 at the bottom of the housing assembly 16.

Any particulate material which randomly escapes the area around the impeller 40 is deflected away from the fan 42 by the rear plate 56 or the deflector fan 62 (see FIGS. 3, 6A, and 6B). Most of the air from the fan 42 mixes with the particulate material and exits through the discharge opening 18. However, some of the air flow may transfer so much energy to the particulate material that it does not have sufficient velocity to exit the discharge opening 18. This decelerated air flow is recirculated through the opening(s) 66 or 68 in the rear plate 56 of the fan 42. The recycled air is then reaccelerated by the fan blades 60. The deflector fan 62 is adapted to pull air into the recirculation opening 66 but the blades 64 are relatively flatly inclined and tilted in a reverse direction. Thus, the deflector blades 64 gently deflect any particulate material and prevent it from entering the recirculation opening 66. In the alternative embodiment of FIG. 6B, the small diameter vent holes 68 perform essentially the same function as opening 66 and the deflector fan 62. The size and or rotational speed of the holes 68 prevent particulate material from entering and being damaged by the fan blades 60.

Referring to FIG. 1A, the accelerated grain travels through the conduit 82 to the separating and discharging device 84. The particulate material is separated from the air which is exhausted from the device 84, as shown by the arrow A3. The particulate material is then routed through a cyclone discharge in the device 84 and deposited in the bin 86 waiting below. Of course, in the alternate embodiment of FIG. 1B, the particulate material is discharged through the manifold 92 and deposited in the bins 86A–86F through the respective discharge outlets 94A–94F.

From the foregoing, it can be seen that the present invention accelerates and conveys particulate material with minimal damage and maximum efficiency. The particulate material can be accelerated in two stages. In the first stage, the auger 38 and the impeller 40 mechanically accelerate the particulate material to a given velocity. Then the air flow from the fan 42 further accelerates the particulate material without the fan blades 60 contacting the material.

It is contemplated that the impeller 40 could be eliminated from the device 10 altogether for certain applications. The particulate material could be delivered by the auger 38 to the mixing section of the housing assembly 16 and the air flow alone could accelerate the particulate material to the desired velocity and cause it to be discharged through the mixture outlet 18. While this embodiment would not provide as high of velocities as the preferred embodiment, less mechanical damage to the particulate material would be likely to result.

The auger 38 could also be eliminated, while the impeller 40 and the fan 42 are retained. The accelerator conveyor 10 could be rotated ninety degrees and the material could be gravity fed into the impeller 40. Another alternative is to use the vacuum created inside the conveyor (particularly near the center of the impeller) to feed the material, regardless of the position of the conveyor 10.

In the drawings and specification there has been set forth a preferred embodiment of the invention, and although specific terms are employed, these are used in the generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. An apparatus for accelerating particulate material, comprising:

a housing having a wall with openings therein for an air inlet, a particulate material inlet, and a mixture outlet, said outlet receiving a mixture of said particulate material and air;

an impeller rotatably mounted in the housing adjacent the mixture outlet, the impeller having opposite sides, one of the sides having a plurality of impeller blades thereon for accelerating particulate material;

a feed auger rotatably mounted in the housing and in fluid communication with the particulate material inlet so as to convey particulate material from the particulate material inlet toward the impeller blades;

a fan rotatably mounted in the housing in fluid communication with the air inlet and the impeller, the fan including a plurality of fan blades for accelerating air from the air inlet toward the housing wall and thereby providing a flow of accelerated air along the inside of the wall of the housing and circumferentially around the impeller to further accelerate the particulate material toward the mixture outlet, the rotational axes of said fan and impeller in general registration with each other;

whereby the flow of accelerated air from the fan prevents particulate material from contacting the fan blades and thereby damaging the particulate material.

2. The apparatus of claim 1 wherein communication between the air inlet and particulate material inlet is at least partially blocked by the impeller.

3. The apparatus of claim 1 wherein the housing has a handle thereon and is thereby portable.

4. The apparatus of claim 1 wherein the openings for air inlet and particulate material inlet are remote from each other in the housing.

5. The apparatus of claim 1 wherein the impeller blades are angularly spaced around an axis of rotation of the impeller.

6. The apparatus of claim 1 wherein the impeller is rotatably coupled to the auger and the auger has an auger shaft that drives both the auger and the impeller.

7. The apparatus of claim 1 wherein the fan is rotatably mounted along an axis of rotation in the housing and driven by a fan motor having a fan shaft drivingly connected to the fan, and the impeller and auger are rotatably mounted along the axis of rotation and driven by an auger motor located remotely from the fan motor.

8. The apparatus of claim 1 wherein the housing comprises an auger tube for receiving the auger thereinside and a hopper for receiving particulate material, the hopper being mounted on the auger tube and in fluid communication with the auger.

9. The apparatus of claim 1 further comprising a hopper for receiving particulate material, the hopper being in fluid communication with the auger through the particulate material inlet.

10. The apparatus of claim 1 wherein the plurality of impeller blades are forwardly inclined.

11. The apparatus of claim 10 wherein the impeller blades on the impeller have inner and outer tips and said blades are curved between the tips.

12. The apparatus of claim 1 further comprising a conduit having one end connected to the mixture outlet and another end connected to a device for separating and discharging the air and particulate material.

13. The apparatus of claim 12 wherein the conduit is a flexible hose.

14. The apparatus of claim 1 wherein the fan includes a fan wheel mounted on a shaft driven by a fan motor.

15. The apparatus of claim 14 wherein the fan wheel comprises a disc drivingly mounted on the shaft, a ring member spaced apart from and concentric with the disc; the plurality of fan blades being angularly spaced around the fan wheel and secured between the disc and the ring member.

16. The apparatus of claim 15 wherein at least some of the fan blades are forwardly inclined.

17. The apparatus of claim 15 wherein the at least some of the fan blades are curved with respect to a radius of the disc.

18. The apparatus of claim 15 wherein the disc has at least one centrally located vent therethrough.

19. The apparatus of claim 18 wherein the vent comprises a plurality of holes arranged in a circular pattern, the holes having a diameter smaller than the particulate material.

20. The apparatus of claim 18 further comprising a deflector fan drivingly mounted to the fan in covering relation to the vent for preventing particulate material from entering the vent and being damaged by the fan blades.

21. The apparatus of claim 20 wherein the deflector fan has a plurality of angularly spaced generally triangular-shaped blades adapted to allow air into the vent and deflect particulate material away from the vent by a positive air pressure put forth by the deflector fan.

22. An apparatus for accelerating particulate material, comprising:
   a housing having a wall with openings therein for an air inlet, a particulate material inlet, and a mixture outlet, said outlet receiving a mixture of said particulate material and air;
   an impeller rotatably mounted in the housing adjacent the mixture outlet, the impeller having opposite sides, one of the sides having a plurality of impeller blades thereon for accelerating particulate material;
   a fan rotatably mounted in the housing in fluid communication with the air inlet and the impeller, the fan including a plurality of fan blades for accelerating air from the air inlet toward the housing wall and thereby providing a flow of accelerated air along the inside of the wall of the housing and circumferentially around the impeller to further accelerate the particulate material toward the mixture outlet;
   whereby the flow of accelerated air from the fan prevents particulate material, said fan and impeller in general registration with each other from contacting the fan blades and thereby damaging the particulate material.

23. The apparatus of claim 22 wherein the impeller is disposed below the particulate material inlet such that the particulate material is fed into the impeller by gravity.

24. The apparatus of claim 22 wherein the impeller is operatively disposed downstream of the particulate material inlet such that the particulate material is fed into the impeller by vacuum.

25. An apparatus for accelerating particulate material, comprising:
   a housing having an air inlet, a particulate material inlet, and a mixture outlet, said outlet receiving a mixture of said particulate material and air;
   a feed auger extending into the housing and being in fluid communication with the particulate material inlet;
   an impeller mounted in the housing adjacent the mixture outlet, the impeller having a plurality of impeller blades thereon extending generally toward the auger for accelerating particulate material;
   a fan mounted on the housing in fluid communication with the air inlet, the fan including a plurality of fan blades thereon for accelerating air from the air inlet toward the impeller, the impeller and fan being generally aligned with each other;
   the impeller being interposed between the fan and the feed auger so as provide a partition between the particulate material and the fan blades.

26. An apparatus for accelerating particulate material, comprising:
   a housing having a wall including openings therein for an air inlet, a particulate material inlet, and a mixture outlet, said outlet receiving a mixture of said particulate material and air;
   a feed auger extending into the housing and being in fluid communication with the particulate material inlet;
   an impeller mounted in the housing adjacent the mixture outlet, the impeller having a plurality of blades thereon extending generally toward the auger for accelerating particulate material;
   a fan wheel mounted in the housing and in fluid communication with the air inlet, the fan wheel including a plurality of generally radial blades thereon for accelerating air radially outward from the air inlet toward an inside surface of the wall of the housing, the fan wheel and the blades thereof being juxtapositioned with the inside surface of the wall such that a ring of positive air pressure produced by the fan wheel between the wall and the fan wheel prevents particulate material from contacting the blades of the fan wheel.

27. An apparatus for accelerating particulate material, comprising:
   a housing having an air inlet, a particulate material inlet, and a mixture outlet, said outlet receiving a mixture of said particulate material; and air;
   a feed auger extending into the housing and being in fluid communication with the particulate material inlet so as to deliver particulate material into the housing means within the housing to accelerate the particulate material;
   a fan mounted on the housing in fluid communication with the air inlet, the fan including a plurality of fan blades thereon for further accelerating air from the air inlet toward the particulate material delivered into the housing by the auger, the fan blades being juxtapositioned with and directed toward the housing so as to prevent the particulate material from contacting the fan blades, said fan being generally registered with the accelerating means.

28. A method of preventing damage to particulate material accelerated in a particulate material conveyor, comprising:
   conveying the material into a rotary impeller having a plurality of rotating impeller blades;
   accelerating the material by operative engagement with the rotating impeller blades;
   accelerating the material further by circulating an air flow around the periphery of the impeller with a fan having blades; and
   discharging the accelerated particulate material without the material being allowed to come into contact with the fan blades.

29. A method for accelerating and delivering particulate material, comprising:

conveying particulate material from the source to a rotating impeller;

accelerating the particulate material into a mixing chamber with the impeller;

accelerating air with a fan having blades from an air inlet into the mixing chamber without exposing the particulate material to the fan blades;

combining the accelerated air and particulate material in the mixing chamber to further accelerate the particulate material within the mixing chamber;

discharging the particulate material and accelerated air mixed therewith from the mixing chamber through an outlet.

30. The method of claim 29 comprising conveying the particulate material and accelerated air mixed therewith to a separation means and separating the particulate material from the accelerated air thereby depositing the particulate material in one direction and discharging the accelerated air in another direction.

* * * * *

UNITED STATES PATENT AND TRADEMARK OFFICE
CERTIFICATE OF CORRECTION

| | |
|---|---|
| PATENT NO. | : 6,142,714 |
| DATED | : November 7, 2000 |
| INVENTOR(S) | : Montag, Roger A. |

It is certified that error appears in the above-identified patent and that said Letters Patent is hereby corrected as shown below:

Column 7,
Lines 52-53 (claim 22) delete ", said fan and impeller in general registration with each other".
Line 54, (claim 22), after "material" insert --, said fan and impeller being in general registration with each other --.

Signed and Sealed this

Twenty-fifth Day of September, 2001

*Attest:*

*Attesting Officer*

NICHOLAS P. GODICI
*Acting Director of the United States Patent and Trademark Office*